US012666152B2

(12) United States Patent
Högasten et al.

(10) Patent No.: US 12,666,152 B2
(45) Date of Patent: Jun. 23, 2026

(54) MULTIMODAL IMAGER SYSTEMS AND METHODS WITH STEERABLE FIELDS OF VIEW

(71) Applicant: Teledyne FLIR Commercial Systems, Inc., Goleta, CA (US)

(72) Inventors: Nicholas Högasten, Santa Barbara, CA (US); John H. Distelzweig, Santa Barbara, CA (US); Kai Moncino, Santa Barbara, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 227 days.

(21) Appl. No.: 18/488,846

(22) Filed: Oct. 17, 2023

(65) Prior Publication Data

US 2024/0048849 A1 Feb. 8, 2024

Related U.S. Application Data

(63) Continuation of application No. PCT/US2022/025632, filed on Apr. 20, 2022.

(60) Provisional application No. 63/181,132, filed on Apr. 28, 2021.

(51) Int. Cl.
| | |
|---|---|
| *H04N 23/695* | (2023.01) |
| *G01S 13/86* | (2006.01) |
| *G01S 13/89* | (2006.01) |
| *H04N 23/51* | (2023.01) |
| *H04N 23/661* | (2023.01) |

(52) U.S. Cl.
CPC ......... *H04N 23/695* (2023.01); *G01S 13/867* (2013.01); *G01S 13/89* (2013.01); *H04N 23/51* (2023.01); *H04N 23/662* (2023.01)

(58) Field of Classification Search
CPC .... H04N 23/695; H04N 23/51; H04N 23/662; G01S 13/867; G01S 13/89; G01S 7/40; G01S 7/41; G01S 7/4972; G01S 17/86
See application file for complete search history.

(56) References Cited

U.S. PATENT DOCUMENTS

| | | | |
|---|---|---|---|
| 6,370,329 | B1 | 4/2002 | Teuchert |
| 7,869,919 | B1 | 1/2011 | Kostrzewa et al. |
| 8,013,780 | B2 | 9/2011 | Lynam |

(Continued)

FOREIGN PATENT DOCUMENTS

| | | |
|---|---|---|
| EP | 1141760 | 9/2004 |
| JP | 3458486 | 10/2003 |

*Primary Examiner* — Timothy J Henn
(74) *Attorney, Agent, or Firm* — Haynes and Boone, LLP

(57) ABSTRACT

Systems and methods related to steerable fields of view are provided. In one embodiment, a system includes an image sensor configured to capture a field of view. The system further includes an optical assembly including an optical element configured to direct the field of view to the image sensor. The system further includes a logic circuit. The logic circuit may send a control signal to the optical assembly to cause rotation of the optical element about an axis associated with the image sensor to adjust the field of view. The logic circuit may send a control signal to the image sensor to cause one or more images of the object to be captured. The logic circuit may calibrate the image sensor based on the one or more images of the object. Related devices and methods are also provided.

20 Claims, 9 Drawing Sheets

(56)     References Cited

U.S. PATENT DOCUMENTS

| | | | |
|---|---|---|---|
| 2004/0104338 A1* | 6/2004 | Bennett | G01B 11/2518 |
| | | | 250/234 |
| 2010/0141767 A1* | 6/2010 | Mohanty | G08B 13/19643 |
| | | | 348/E5.024 |
| 2012/0169882 A1* | 7/2012 | Millar | G08B 13/19608 |
| | | | 348/E7.086 |
| 2017/0085790 A1* | 3/2017 | Bohn | H04N 23/90 |
| 2018/0376074 A1* | 12/2018 | Gumpert | G08B 13/19641 |
| 2020/0082731 A1 | 3/2020 | Choi et al. | |
| 2020/0158861 A1* | 5/2020 | Cattle | G01S 13/9029 |
| 2020/0177872 A1* | 6/2020 | Herman | H04N 23/56 |
| 2021/0049738 A1 | 2/2021 | Sanchez-Monge et al. | |
| 2021/0063578 A1* | 3/2021 | Wekel | G01S 17/894 |

* cited by examiner

400

500A

500B

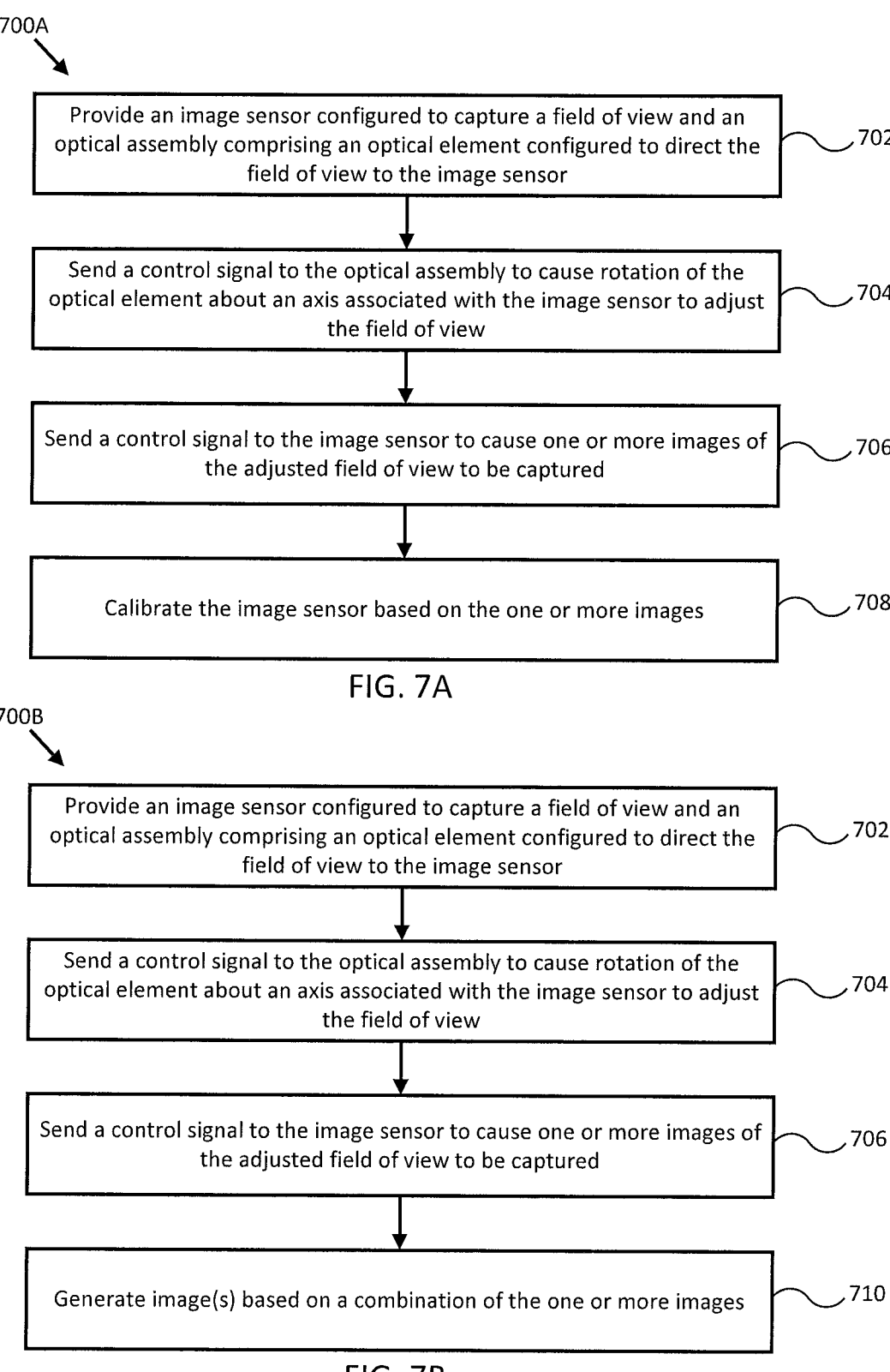

700A

Provide an image sensor configured to capture a field of view and an optical assembly comprising an optical element configured to direct the field of view to the image sensor — 702

Send a control signal to the optical assembly to cause rotation of the optical element about an axis associated with the image sensor to adjust the field of view — 704

Send a control signal to the image sensor to cause one or more images of the adjusted field of view to be captured — 706

Calibrate the image sensor based on the one or more images — 708

Provide an image sensor configured to capture a field of view and an optical assembly comprising an optical element configured to direct the field of view to the image sensor — 702

Send a control signal to the optical assembly to cause rotation of the optical element about an axis associated with the image sensor to adjust the field of view — 704

Send a control signal to the image sensor to cause one or more images of the adjusted field of view to be captured — 706

Generate image(s) based on a combination of the one or more images — 710

FIG. 7B

800
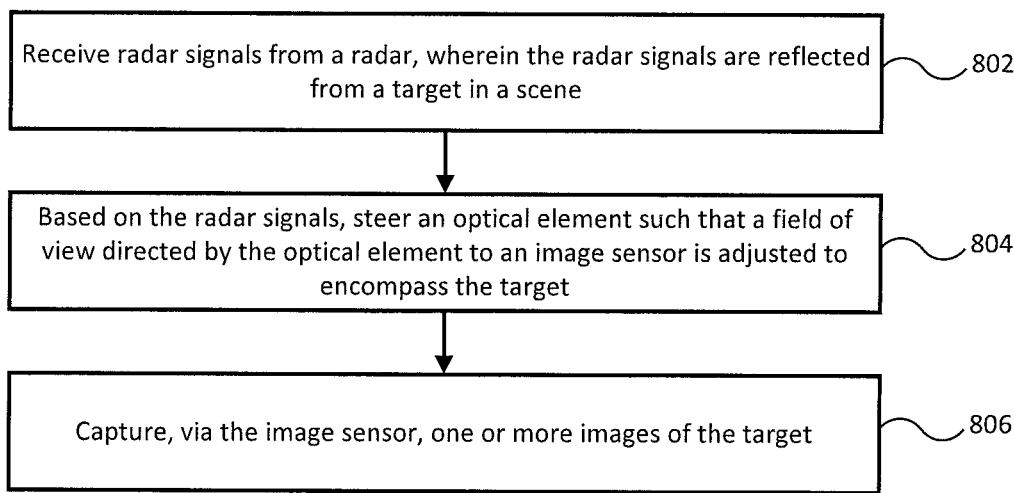
Receive radar signals from a radar, wherein the radar signals are reflected from a target in a scene ⟶ 802
Based on the radar signals, steer an optical element such that a field of view directed by the optical element to an image sensor is adjusted to encompass the target ⟶ 804
Capture, via the image sensor, one or more images of the target ⟶ 806
FIG. 8

MULTIMODAL IMAGER SYSTEMS AND METHODS WITH STEERABLE FIELDS OF VIEW

CROSS REFERENCE TO RELATED APPLICATIONS

This application is a continuation of International Patent Application No. PCT/US2022/025632 filed Apr. 20, 2022 and entitled "MULTIMODAL IMAGER SYSTEMS AND METHODS WITH STEERABLE FIELDS OF VIEW," which claims priority to and the benefit of U.S. Provisional Patent Application No. 63/181,132 filed Apr. 28, 2021 and entitled "MULTIMODAL IMAGER SYSTEMS AND METHODS WITH STEERABLE FIELDS OF VIEW," all of which are hereby incorporated by reference in their entirety.

TECHNICAL FIELD

One or more embodiments generally relate to image processing, calibration, and classification and more particularly, for example, to the use of steerable fields of view in image processing, imager calibration, and machine learning classification.

BACKGROUND

Imaging systems may include an array of detectors (e.g., sensors), with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems. Radar systems are commonly used to detect targets (e.g., objects, geographic features, or other types of targets), such as targets in proximity to watercraft, aircraft, vehicles, or fixed locations. The radar systems may transmit (e.g., broadcast) radar signals and receive return signals. Such return signals may be based on reflections of the transmitted radar signals by targets.

SUMMARY

Various embodiments related to steerable fields of view are disclosed. For example, a system may include an image sensor configured to capture a field of view. The system may further include an optical assembly including an optical element configured to direct the field of view to the image sensor. The system may further include a logic circuit. The logic circuit may send a control signal to the optical assembly to cause rotation of the optical element about an axis associated with the image sensor to adjust the field of view. The logic circuit may send a control signal to the image sensor to cause one or more images of the object to be captured by the image sensor. The logic circuit may calibrate the image sensor based on the one or more images. For example, the captured images may be of a scene for scene-based calibration. As another example, the captured images may be of an object, such as a calibration object to perform flat-field correction.

In an embodiment, the system may further include a radar configured to send and receive radar signals. The logic circuit may receive the radar signals from the radar and, based on the radar signals, send a control signal to the optical assembly to cause rotation of the optical element to adjust the field of view. For example, the field of view may be adjusted to encompass a target detected by the radar.

In an embodiment, the system may operate in a first mode, wherein a control signal may be sent to the optical assembly to cause the optical assembly to rotate the optical element about the axis to adjust the field of view in an oscillating fashion. Images of the oscillating field of view may be captured and combined to generate a panoramic image. A second mode of operation may include placing the optical element in a stationary position, for example, in response to received radar signals and capturing the field of view, via the image sensor, when the optical element is in the stationary position. In one embodiment, the optical element may be rotated at sub-pixel increments so that images captured while the field of view adjusts on the sub-pixel basis may be combined to generate a super resolution image.

In a further embodiment, the logic circuit may be configured to classify the target in the scene based on images of the field of view encompassing the target and radar signal reflected by the target and received by the radar. Various embodiments may include training a classifier of the imaging system based on ground truth data obtained from the radar and training a classifier of the radar based on ground truth data obtained from the imaging system.

The scope of the invention is defined by the claims, which are incorporated into this section by reference. It will be appreciated that devices, systems, methods, and non-transitory machine-readable mediums may be utilized to perform several of the operations described herein. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7A illustrates a flow diagram of an example process for calibrating a system in accordance with one or more embodiments of the present disclosure.

FIG. 7B illustrates a flow diagram of an example process for imaging in accordance with one or more embodiments of the present disclosure.

FIG. 8 illustrates a flow diagram of an example process for using the system of FIG. 4 system in accordance with one or more embodiments of the present disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
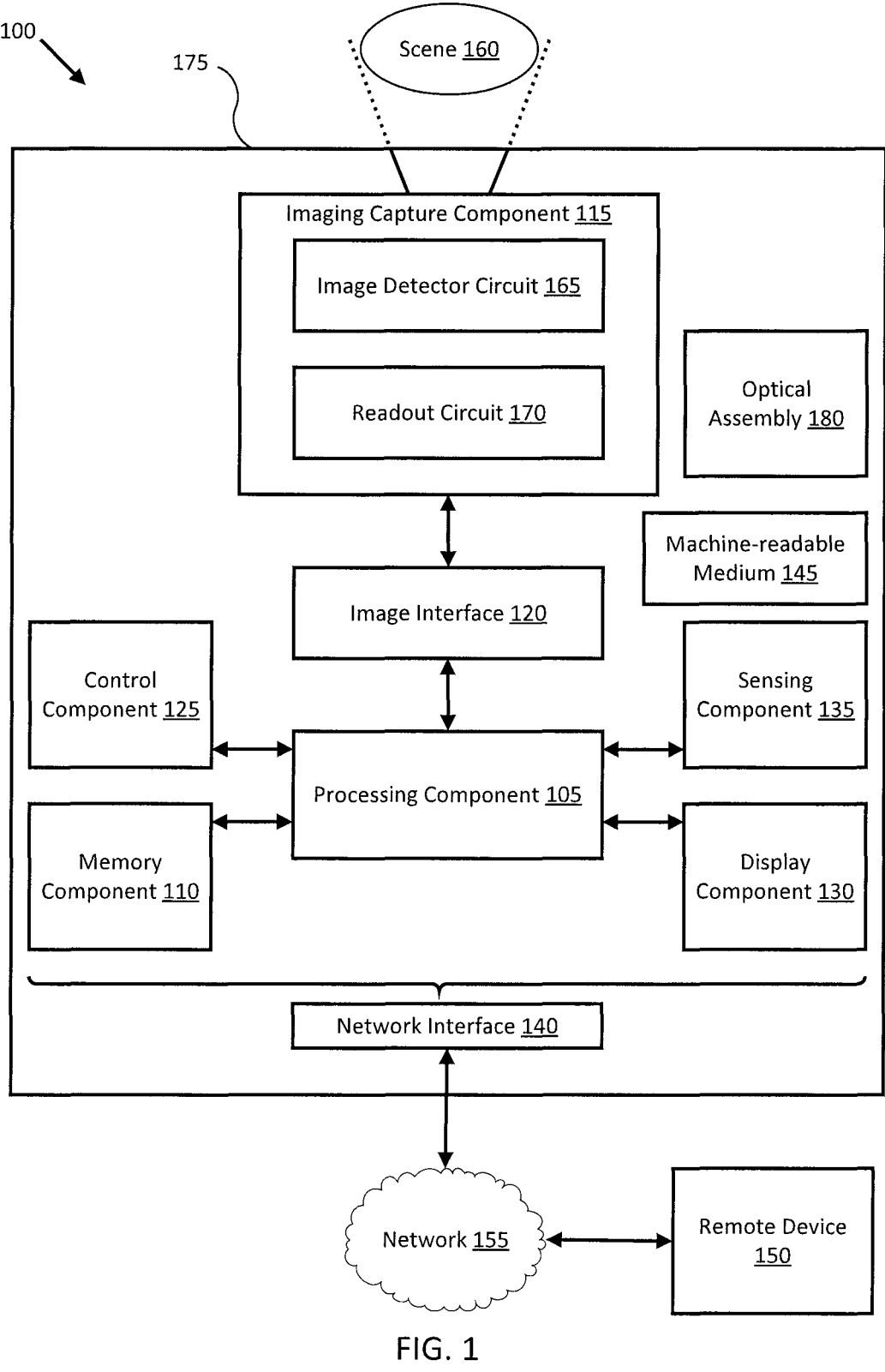
FIG. 1 illustrates a block diagram of an example imaging system in accordance with one or more embodiments of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure is directed to systems and methods for imaging, classification, and calibration using a system having a steerable field of view. A steerable field of view may allow for multiple imagers to be replaced with a single imager having the steerable field of view. In one embodiment, a system may include an image sensor and an optical assembly. The optical assembly may include an optical element and an actuator coupled to the optical element. The actuator may be configured to adjust an angular position/ orientation of the optical element (e.g., a mirror) such that the optical element directs EM radiation to the image sensor to capture a field of view. As the optical element is rotated, the field of view directed by the optical element to the image sensor may be adjusted.

In some embodiments, a panoramic mode of operation may be provided in which the optical assembly may be instructed by a logic circuit of the system to rotate the optical element, via the actuator, through an angle, back and forth, in an oscillating fashion. By rotating the optical element through the angle, the field of view directed to the image sensor may vary in correlation to the rotation of the optical element. The image sensor may capture images as the optical element is rotated to provide images that capture the field of view as the field of view is adjusted in correlation to the rotation. For example, the images may capture overlapping portions of a scene corresponding to the overlapping fields of view that occur in the rotation. The captured images may be deblurred, denoised, dewarped, and/or stitched/ combined to generate a panoramic image.

In some embodiments, a staring mode of operation may be provided in which the optical assembly is instructed to rotate the optical element, via the actuator, to a particular position/orientation and maintain the optical element at that particular position/orientation so that one or more images can be captured of a particular field of view associated with the position/orientation. In one embodiment, the system may enter the staring mode in response to radar signals received from a radar system. For example, the radar system may detect a target in a scene based on radar return signals reflected from the target. The logic circuit may send a control signal to the optical assembly to cause the actuator to adjust the optical element such that the field of view provided to the image sensor encompasses the target detected by the radar system. As such, the system (e.g., an image sensor or imager of the system) may be placed into the staring mode based on the radar signals and the particular field of view may allow for capturing images of the target that was detected by the radar system. In further embodiments, classification of the target based on the images of the target and/or the radar signals reflected from the target may be performed. For example, the target may be classified as a human, animal, vehicle, etc.

In various embodiments, the two modes described above may be used in non-linear mapping. For example, the mapping can be from a panoramic image captured in the panoramic mode, which may be of lesser quality, to a high-quality image captured in the staring mode. For example, machine learning can be performed to learn how to map low-quality images to high-quality images by generating ground truth data (e.g., the high-quality image) from the staring mode and determining the corresponding input (e.g., the low-quality images) from the panoramic mode. Thus, a trained system may allow for inputs from low-quality images captured in the panoramic mode to be directly mapped to a high-quality image output.

Rotation of the optical element may be within a housing of the system such that, from an exterior observation, the system appears motionless while a field of view directed to the image sensor in the system may be adjusted to provide various degrees of viewing. As such, twisting and tangling of cables may be avoided and a mass of rotating components may be minimized. In one embodiment, the optical element may be rotated about an axis associated with the image sensor such that the field of view may be steered. In some cases, the optical element may have another axis of rotation that allows the optical element to be flipped from a first side facing the image sensor to a reverse second side facing the image sensor. In some embodiments, scene-based non-uniformity correction may be performed by capturing images of a non-changing scene using both sides of the optical element. In other embodiments, scene-based non-uniformity correction may be performed using the first side of the optical element and determining an angular motion of the field of view (e.g., a motion correlated to the rotation of the optical element). The optical element may also be rotated about a pivot point to adjust an orientation of the optical element and further adjust the field of view directed to the image sensor.

In some embodiments, the optical element may be adjusted so that the field of view encompasses at least a portion of an object (e.g., a calibration object). In an aspect, the object may be enclosed within the housing and/or may form a part of the housing. As one example, the object may form a part of an internal surface of the housing. In another aspect, the object may be a reverse-side of the optical element. For example, where the optical element is a mirror, a reverse-side of the minor may be less reflective and used as a calibration object when the mirror is rotated or flipped to have its reverse-side facing the image sensor.

In further embodiments, the object may have a uniform flat surface that can be imaged to provide offset biasing for calibrating the image sensor to cancel the effects of image artifacts caused by variations in pixel-to-pixel sensitivity of the detectors of the image sensor and by distortions in an optical path. For example, flat-field correction methods may be used to calibrate the image sensor by using the object as a uniform intensity source. In yet further embodiments, the object may be temperature-controlled to allow the image sensor to capture the object at two or more different temperatures to determine per-pixel gain and offset biasing for calibrating the image sensor.

In some embodiments, the reverse-side of the optical element may be reflective but have a lower reflectivity than a primary side of the optical element. As an example, the optical element may be a mirror that has a more reflective primary side than the reverse-side. In some cases, scene-based non-uniformity correction may be performed by assuming scene EM radiance is essentially unchanged between the capture of an image of the scene using the more reflective side of the minor and the less reflective side of the mirror.

In one embodiment, scene-based non-uniformity correction may be performed based on the known motion of the rotating optical element. For example, the rotating motion of the optical element is known to the system as the rotation is controlled by the system (e.g., as a control signal provided by a logic circuit of the system to the optical assembly). Thus, the logic circuit may determine frame-to-frame motion between a first image and a second image of images captured of the scene based on the known rotation motion of the optical element. If the scene can be assumed to be unchanging between images, identical scene coordinates of the first image and the second image may be compared based on the frame-to-frame motion to determine pixel intensity differences. The image sensor may be calibrated based on the pixel intensity differences.

In some embodiments, an object may span or cover the adjusted field of view of the image sensor such that each of the detectors (e.g., pixels) of the image sensor can sense EM radiation from the object in one frame. In some embodiments, the object may not need to span or cover the entire adjusted field of view. For example, in some cases, the object may span or cover less than the adjusted field of view such that subsets of the detectors (e.g., one or more subsets of the full set of detectors in a detector array of the image sensor) of the image sensor sequentially sense the object as the optical element is rotated about the axis associated with the image sensor to adjust the field of view. In this regard, the field of view can be steered such that all detectors of the image sensor at some point have imaged the object. For example, the object may be a narrow vertical object spanning a subset of the detector columns of the image sensor in any given image as the images are captured during rotation of the optical element.

According to various embodiments, the system may include an imaging system and a radar system. In such embodiments, radar return signals received by the radar system may be used to detect the presence of a target in a scene. In some cases, the target may be classified (e.g., as human, vehicle, animal, etc.) based on the radar return signals. In some cases, the radar return signals may be correlated to an XY location in an image space (e.g., thermal image space, visible image space) associated with the imaging system. Further, the imaging system may capture images of the target to assist in classifying the target. For example, classification of the target may be performed based on the captured images of the target, the radar return signals, and the correlation of the radar return signals to the image space.

In other embodiments, more than one imager may be used in classification. For example, a thermal imager, near infrared (NIR) imager, short-wave infrared (SWIR) imager, and/or visible light imager may be implemented to capture images of a target. The images captured by the various imagers may assist in the classification of the target. For example, if the target, with sufficient certainty, can be classified as being of a particular class based on a signal (e.g., images) captured by a first imager in a first wave band, the signal from the first wave band may be used to augment the classifier of another waveband.

The following are examples of implementing several modalities (e.g., such as imagers) in combination. A first classifier for a first imager may be a trained artificial neural network classifier. If a second classifier of a second imager (e.g., the second imager being an imager that images a different waveband than the first imager) is not able to classify a target in a scene with sufficient certainty, the signal from the second classifier may be included in a training data set along with ground truth data (e.g., high-certainty classification of the target) obtained from the first classifier. By including the signal from the second imager in the training data set along with ground truth data obtained from the first classifier, the second classifier may learn how to classify targets better based on the signals from the second imager. As an illustrative example, a visible light waveband classifier and a radar-based classifier may be implemented. In this example, the visible light waveband classifier may be in a state where it has a large amount of ground truth data during daytime operation of a visible light imager, whereas the radar-based classifier may have less available ground truth data during operation of a radar (e.g., the radar may be untrained at this point). During poor illumination such as at nighttime, the visible light classifier may not be able to rely on the visible light imager to classify a target to a high degree of certainty. One solution would be to have the radar-based classifier improve classification capability during the daytime by using the high-certainty classifications from the visible light imager (e.g., the ground truth data from the visible light imager). Then, during the nighttime operation of the visible light imager, radar-based classifications, which were improved during the daytime, may now be used to train the visible light classifier for better nighttime operation. In the aforementioned example, an ultraviolet (UV) imager and classifier and/or a long wavelength infrared imager and classifier may be implemented for similar results.

In some cases, one multimodal classifier may be trained to perform classification based on two or more modalities. For example, data/signals from more than one modality may be combined into a unified training data set to train the multimodal classifier. The multimodal classifier may combine and appropriately weight signals from the two or more modalities to determine a single classification of a target. As an example, a multimodal classifier may classify a target based on a signal provided by a visible light imager, a radar, and other modalities.

Referring now to the drawings, FIG. 1 illustrates a block diagram of an example imaging system 100 (e.g., an infrared camera) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing 175 that at least partially encloses components of the imaging system 100, such as to facilitate compactness and protection of the imaging system 100. The housing 175 may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, an optical assembly 180, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., a field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 180, etc.) of the imaging system 100 to perform such operations. For example, the processing component 105 may be configured to process captured image data received from the image capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, object classification, video analytics, etc.).

The memory component 110 includes, in one embodiment, one or more memory devices configured to store data and information, including infrared image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. The processing component 105 and/or the image interface 120 may be configured to store in the memory component 110 images or digital image data captured by the image capture component 115. The processing component 105 may be configured to store processed still and/or video images in the memory component 110.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes an image detector circuit 165 (e.g., a thermal infrared detector circuit) and a readout circuit 170 (e.g., an ROIC). For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or a portion thereof. For example, in some aspects, the image detector circuit 165 may be sensitive to (e.g., better detect) SWIR radiation, mid-wave IR (MWIR) radiation (e.g., EM radiation with wavelength of 2-5 μm) and/or long-wave IR (LWIR) radiation (e.g., EM radiation with wavelength of 7-14 μm), or any desired IR wavelengths (e.g., generally in the 0.7 to 14 μm range). In other aspects, the image detector circuit 165 may capture radiation from one or more other wavebands of the EM spectrum, such as visible-light, ultraviolet light, and so forth.

The image detector circuit 165 may capture image data associated with the scene 160. To capture the image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. In an aspect, each detector has an active area for capturing the respective portion of the image data. A non-active area of a detector may refer to any portion of the detector that is not the active area. The pixel value generated by the detector may be referred to as an output of the detector. By way of non-limiting example, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns. Although the present disclosure generally refers to various operations performed on rows and/or columns, rows may be used as columns and columns may be used as rows as appropriate.

In an aspect, the imaging system 100 (e.g., the image capture component 115 of the imaging system 100) may include one or more optical elements (e.g., mirrors, lenses, beamsplitters, beam couplers, etc.) to direct EM radiation to the image detector circuit 165. In some cases, an optical element may be at least partially within the housing of the imaging system 100. In various embodiments, the optical assembly 180 may include one or more optical elements and an actuator configured to adjust an orientation/position of the optical element(s) to direct EM radiation to the image detector circuit 165 (e.g., an image sensor of the image detector circuit 165). In some cases, a field of view of the image detector circuit 165 can be steered be sending a control signal to the optical assembly 180 to cause the actuator to adjust the optical element(s). In some embodiments, a light shield is provided within the housing of the imaging system 100 to block stray EM radiation (e.g., also referred to as stray light) from being captured by the image detector circuit 165. In an aspect, the light shield is coupled to a surface of the readout circuit 170. For example, the light shield may prevent stray light from being bent (e.g., refracted) by a detector substrate (e.g., an edge of a detector substrate) and directed to an active area of the image detector circuit 165.

The image may be, or may be considered, a data structure that includes pixels and is a representation of the image data associated with the scene 160, with each pixel having a pixel value that represents EM radiation emitted or reflected from a portion of the scene and received by a detector that generates the pixel value. Based on context, a pixel may refer to a detector of the image detector circuit 165 that generates an associated pixel value or a pixel (e.g., pixel location, pixel coordinate) of the image formed from the generated pixel values.

In an embodiment, the pixel values generated by the image detector circuit 165 may be represented in terms of digital count values generated based on the electrical signals obtained from converting the detected radiation. For example, in a case that the image detector circuit 165 includes or is otherwise coupled to an ADC circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 165 (e.g., an IR image detector circuit) is associated with higher digital count values and higher temperatures.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., images per second) at which images are detected in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period). In some cases, ADC circuits to generate digital count values for detectors of the image detector circuit 165 may be implemented as part of the image detector circuit 165. In other cases, such ADC circuits may be implemented as part of the readout circuit 170.

In various embodiments, a combination of the image detector circuit 165 and the readout circuit 170 may be, may include, or may together provide an FPA. In some aspects, the image detector circuit 165 may be a thermal image detector circuit that includes an array of microbolometers, and the combination of the image detector circuit 165 and the readout circuit 170 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometer FPA may include IR detecting materials such as amorphous silicon (a-Si), vanadium oxide ($VO_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 115 may include one or more filters adapted to pass radiation of some wavelengths but substantially block radiation of other wavelengths. For example, the image capture component 115 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 115 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 115 may include an IR imaging sensor having an FPA of detectors responsive to IR radiation including NIR, SWIR, MWIR, LWIR, and/or very-long wave IR (VLWIR) radiation. In some other embodiments, alternatively or in addition, the image capture component 115 may include a complementary metal oxide semiconductor (CMOS) sensor or a charge-coupled device (CCD) sensor that can be found in any consumer camera (e.g., visible light camera).

Other imaging sensors that may be embodied in the image capture component 115 include a photonic mixer device (PMD) imaging sensor or other time of flight (ToF) imaging sensor, light detection and ranging (LIDAR) imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

In some embodiments, the image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera. As one example, a user may use a push button to control the optical assembly 180 to adjust the field of view.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include the network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, the image capture component 115, the image interface 120, the display component 130, the sensing component 135, and/or the network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

Figure 2:
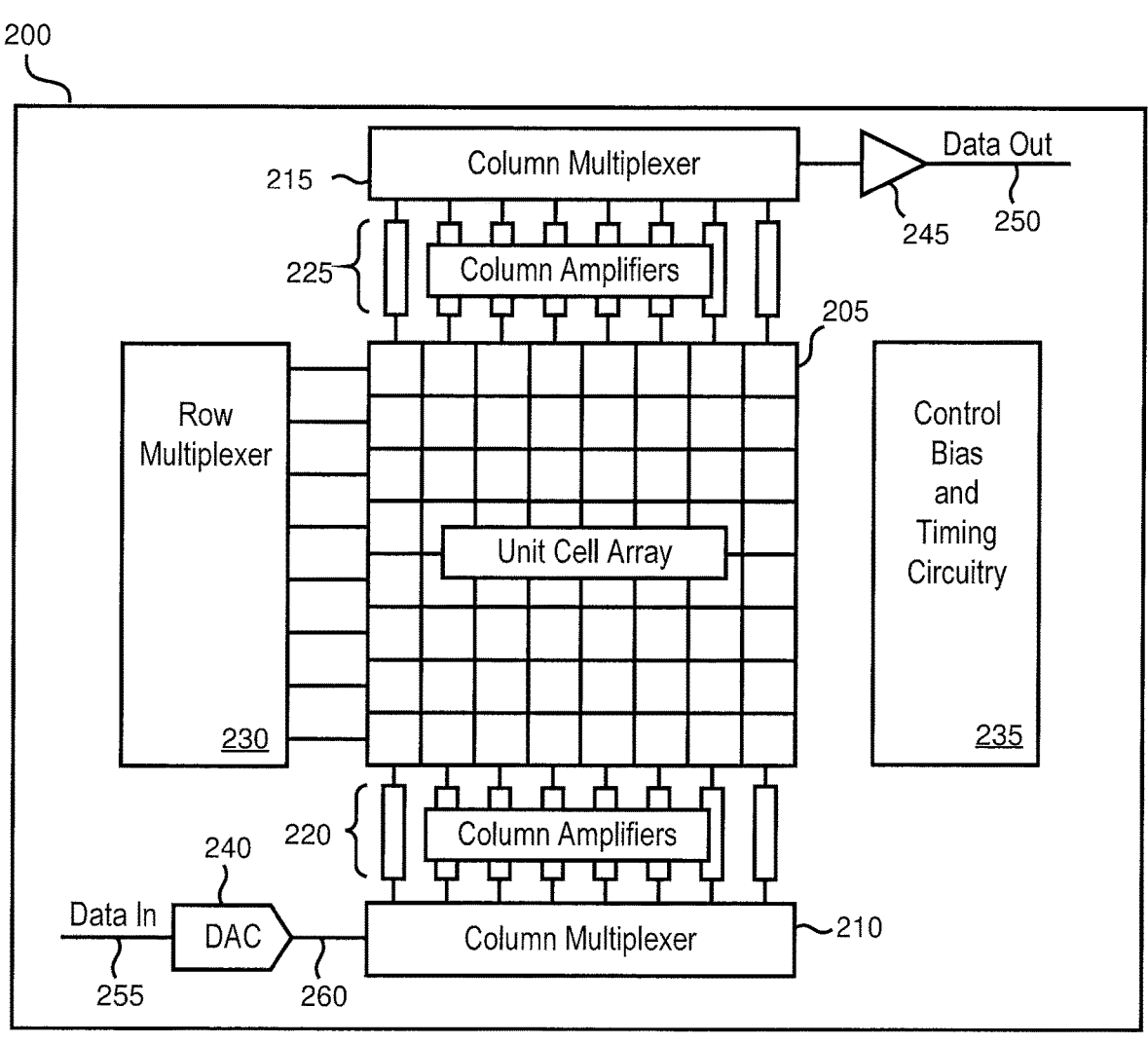
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 200 may be an FPA, for example, implemented as the image capture component 115 of FIG. 1.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. The unit cell array 205 includes an array of unit cells. In an aspect, each unit cell may include a detector and interface circuitry. The interface circuitry of each unit cell may provide an output signal, such as an output voltage or an output current, in response to a detector signal (e.g., detector current, detector voltage) provided by the detector of the unit cell. The output signal may be indicative of the magnitude of EM radiation received by the detector. The column multiplexer 215, the column amplifiers 220, the row multiplexer 230, and the data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide an ROIC (or portion thereof) of the image sensor assembly 200.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., IR light) incident on the detectors of the unit cells.

In an aspect, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, the data input signal line 255, and/or the analog signal line(s) 260. In an embodiment, the control bias and timing circuitry 235 may be, may include, may be a part of, or may otherwise be coupled to the processing component 105 and/or image capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an embodiment, components of the image sensor assembly 200 may be implemented such that a detector array is hybridized to (e.g., bonded to) a readout circuit. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (NUC), spatial and/or temporal filtering, and/or other operations. The images (e.g., processed images) may be stored in memory (e.g., external to or local to the imaging system) and/or displayed on a display device (e.g., external to and/or integrated with the imaging system).

By way of non-limiting examples, the unit cell array 205 may include 512×512 (e.g., 512 rows and 512 columns of unit cells), 1024×1024, 2048×2048, 4096×4096, 8192× 8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 205 may represent a pixel.

Figure 3:
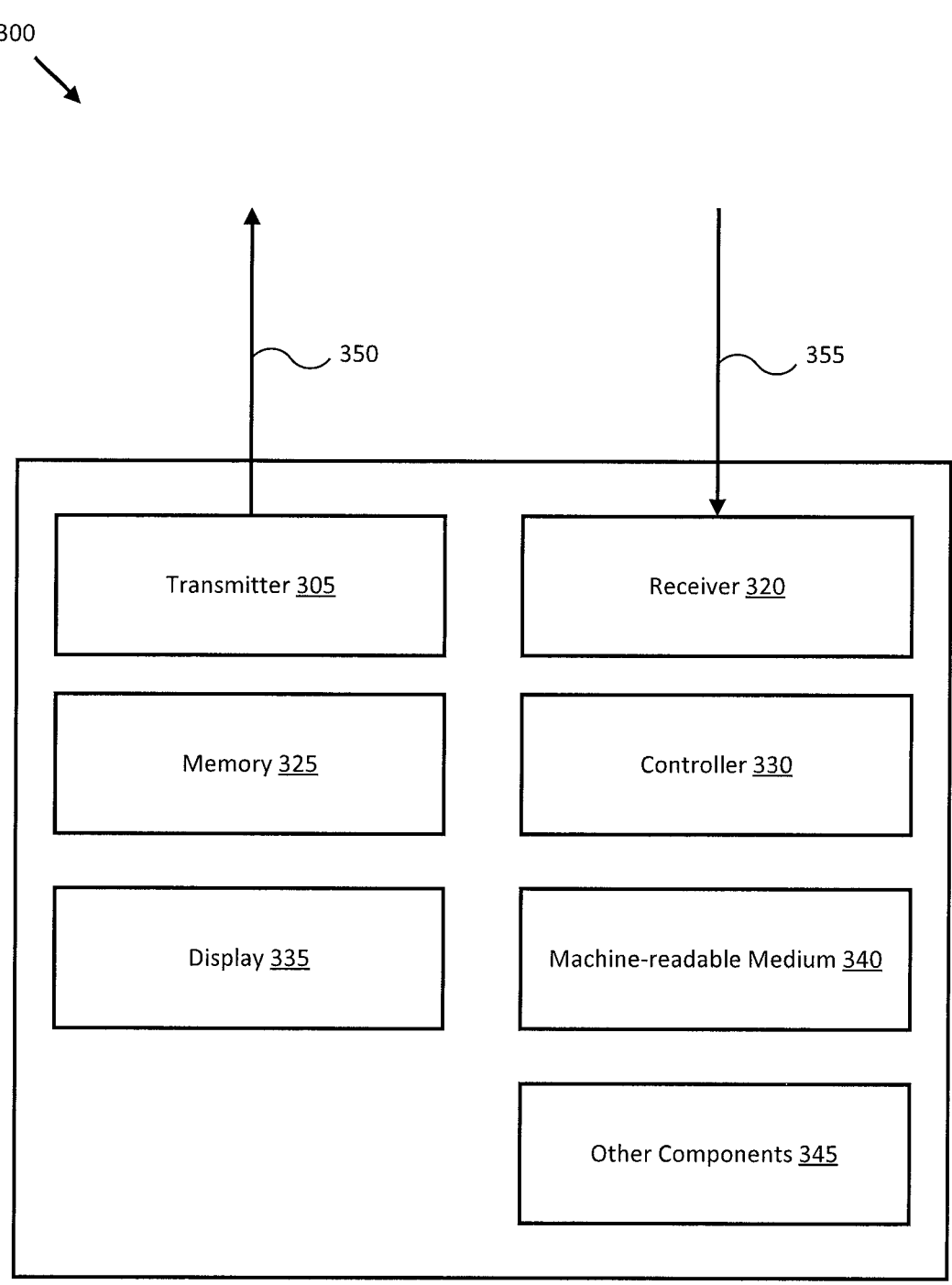
FIG. 3 illustrates a block diagram of an example radar system in accordance with one or more embodiments of the present disclosure.

Referring now to FIG. 3, illustrated is a block diagram of a radar system 300 in accordance with one or more embodiments of the present disclosure. Variations in the arrangement and type of the components may be made without departing from the spirit or scope of the claims as set forth herein. Additional components, different components, and/ or fewer components may be provided. In various embodiments, the radar system 300 may be configured for use on watercraft, aircraft, vehicles, construction machinery (e.g., cranes), fixed locations such as buildings, or other environments, and may be used for various applications such as, for example, leisure, commercial, military navigation and/or security. Other types of navigation and/or security and additional applications are also contemplated. In one aspect, the radar system 300 may be implemented as a relatively compact portable unit that may be conveniently installed by a user. As some examples, the radar system 300 may be installed in a mobile device, on a building or other physical structure, as a component of an imaging system, and on a vehicle.

The radar system 300 includes a transmitter circuitry 305, a receiver circuitry 320, a memory 325, a controller 330, a display 335, a machine-readable medium 340, and other components 345. In an aspect, a radar device may include the transmitter circuitry 305 and the receiver circuitry 320. In some cases, the radar device may include other components shown in FIG. 3, such as the memory 325 and/or the controller 330. The transmitter circuitry 305 includes one or more transmit (TX) antenna elements and appropriate circuitry to generate radar signals and provide such radar signals to the TX antenna elements, such that these radar signals can be transmitted by the TX antenna elements. Such transmitted radar signals are denoted as signals 350 of FIG. 3. The transmitter circuitry 305 may include a waveform generator that generates various waveforms to be utilized as radar signals. Such waveforms may include pulses of various lengths (e.g., different pulse widths), frequency-modulated continuous-wave (FMCW) signals, and/or other waveforms appropriate for radar applications. FMCW signals may be implemented, for example, as rising, falling, or rising/falling frequency sweeps (e.g., upchirps, downchirps, or up/down chirps). The transmitter circuitry 305 may include one or more power amplifiers that receive the radar signals from the waveform generator and drive the radar signals on the TX antenna element(s) of the transmitter circuitry 305. In some cases, characteristics of the radar signals may be based at least in part from control signals received by the controller 330.

The receiver circuitry 320 may include one or more receive (RX) antenna elements (e.g., phased array antennas) and circuitry to process radar signals received by the RX antenna elements. Such received radar signals are denoted as signals 355 in FIG. 3. The RX antenna elements can receive the radar signals 355, which may be reflections of the transmitted radar signals 350 from targets/objects in a scene or detection area or radar signals emitted directly from the targets/objects. In some cases, received radar signals 355 that were reflected from a target/object may be referred to as received return signals. The receiver circuitry 320 may include appropriate circuitry to process these received signals. The receiver circuitry 320 may include one or more low-noise amplifiers (LNAs) for amplifying the received radar signals 355. The receiver circuitry 320 may include a demodulator to receive the radar signals 355 and convert the received radar signals 355 to baseband. In some cases, the demodulator may generate I signals and Q signals based on the received radar signals 355. The receiver circuitry 320 may include filters (e.g., low-pass filters, band-pass filters, high-pass filters) to be applied to the radar signals (e.g., baseband radar signals). The receiver circuitry 320 may include an analog-to-digital (ADC) circuit to convert the received radar signals 355, or filtered versions thereof, which are analog signals, to digital radar signals. The digital radar signals may be provided to the controller 330 for further processing to facilitate radar applications (e.g., target detection applications).

The controller 330 may be implemented as any appropriate processing device (e.g., microcontroller, processor, application specific integrated circuit (ASIC), logic device, field-programmable gate array (FPGA), circuit, or other device) that may be used by the radar system 300 to execute appropriate instructions, such as non-transitory machine readable instructions (e.g., software) stored on the machine-readable medium 340 and loaded into the memory 325. For example, on an RX side, the controller 330 may be configured to receive and process radar data received by the receiver circuitry 320, store the radar data, processed radar data, and/or other data associated with the radar data in the memory 325, and provide the radar data, processed radar data, and/or other data associated with the radar data for processing, storage, and/or display. In this example, outputs of the controller 330 may be, or may be derived into, representations of processed radar data that can be displayed by the display 335 for presentation to one or more users. On a TX side, the controller 330 may generate radar signals or associated signals to cause radar signals to be generated and fed to the transmitter circuitry 305, such that these radar signals can be transmitted by the TX antenna element(s) of the transmitter circuitry 305. In an embodiment, the controller 330 may be utilized to process radar return data (e.g., perform fast Fourier Transforms (FFTs), perform detection processing on FFT outputs) received via the receiver circuitry 320, generate target data, perform mitigation actions or cause performing of mitigation actions if appropriate in response to the target data, and/or other operations.

The memory 325 includes, in one embodiment, one or more memory devices configured to store data and information, including radar data. The memory 325 may include one or more various types of memory devices including volatile and non-volatile memory devices, such as RAM, DRAM, SRAM, NVRAM, ROM, PROM, EPROM, EEPROM, flash memory, hard disk drive, and/or other types of memory. As discussed above, the controller 330 may be configured to execute software instructions stored in the memory 325 so as to perform method and process steps and/or operations. The controller 330 may be configured to store in the memory 325 data such as, by way of non-limiting example, filter coefficients, beamforming coefficients, and target/object detection data.

The display 335 may be used to present radar data, images, or information received or processed by the radar system 300. In one embodiment, the display 335 may be a multifunction display with a touchscreen configured to receive user inputs to control the radar system 300.

The radar system 300 may include various other components 345 that may be used to implement other features such as, for example, sensors, actuators, communications modules/nodes, other user controls, communication with other devices, additional and/or other user interface devices, and/or other components. In some embodiments, other components 345 may include a humidity sensor, a wind and/or water temperature sensor, a barometer, a visible spectrum camera, an infrared camera, a compass, an altimeter, a GPS tracking device and/or other sensors and devices providing measurements and/or other sensor signals that can be displayed to a user and/or used by other devices of radar system 300 to provide operational control of the radar system 300. For example, such sensor signals may be utilized to compensate for environmental conditions, such as wind speed and/or direction; swell speed, amplitude, and/or direction; and/or an object in a path (e.g., line of sight) of the radar system 300. Imagers (e.g., visible spectrum camera, infrared camera) may be utilized to provide situational awareness of a scene, such as by providing image data associated with captured radar data. For example, the radar system 300 may include one or more visible spectrum cameras and/or one or more infrared cameras to capture image data of a scene scanned by the radar system 300. Further, the images may provide information that may be used in a classification or calibration process as described herein. In some cases, sensor information can be used to correct for movement (e.g., changes in position, orientation, and/or speed) associated with the radar system 300 between beam emissions to provide improved alignment of corresponding radar returns/samples, for example, and/or to generate imagery based on the measured orientations and/or positions of the radar system 300 assembly/antennas. In some cases, an external orientation and/or position sensor can be used alone or in combination with an integrated sensor or sensors. In some cases, alternatively or in addition to having sensors and/or other devices as part of the radar system 300, the sensors and/or other devices may be collocated with the radar system 300. Such sensors and/or other devices may provide data to the radar system 300 (e.g., via wired and/or wireless communication).

In one embodiment, the other components 345 includes a communication interface that may communicate with another device that may be implemented with some or all of the features of the radar system 300. Such communication may be performed through appropriate wired or wireless signals (e.g., Wi-Fi, Bluetooth, or other standardized or proprietary wireless communication techniques). In one example, the radar system 300 may be located at a first position (e.g., on a bridge of a watercraft in one embodiment) and may communicate with a personal electronic device (e.g., a cell phone, tablet, computer, etc.) located at a second position (e.g., co-located with a user on another location on the watercraft). In this regard, the user's personal electronic device may receive radar data and/or other information from the radar system 300. As a result, the user may conveniently receive relevant information (e.g., radar images, alerts, notifications, installation feedback, calibration information, or other information) even while not in proximity to the radar system 300. Information related to calibration and imaging techniques presented in the disclosure may be provided for display to the user for example. In an implementation, the user may have an application installed on a user device which may receive real time installation feedback as the user is installing the radar system 300 and present such feedback to the user on a display of the user interface to assist the user in installing the radar system 300. Since the user device may be used to help coordinate installation of the radar system 300, the user device may be referred to as a coordinating user device or simply a coordinating device. In an implementation, the application may provide a calibration user interface to allow the user to proceed through instructed steps to calibrate the radar system 300.

Figure 4A:
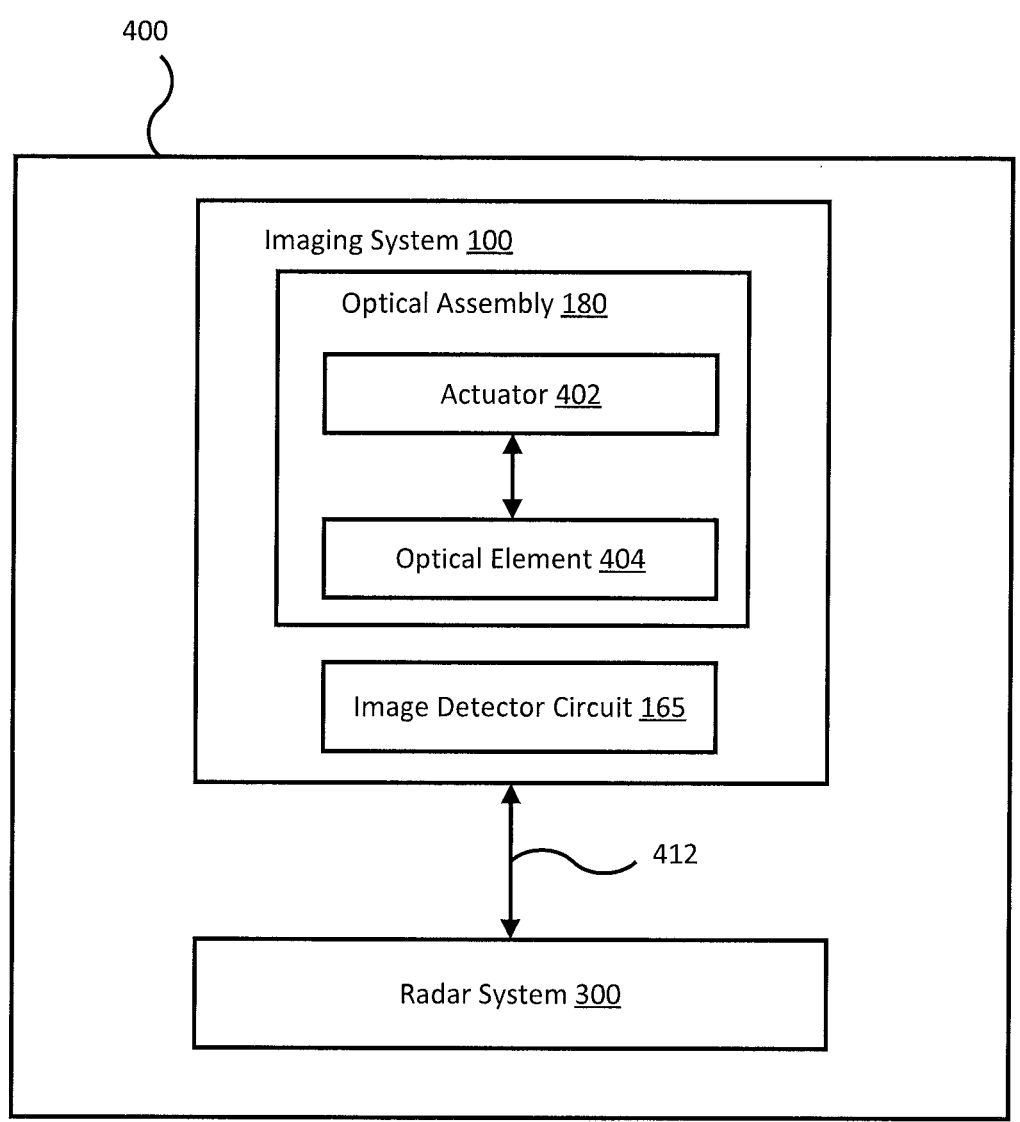
FIGS. 4A and 4B illustrate an example system having a steerable field of view in accordance with one or more embodiments of the present disclosure.
Figure 4B:
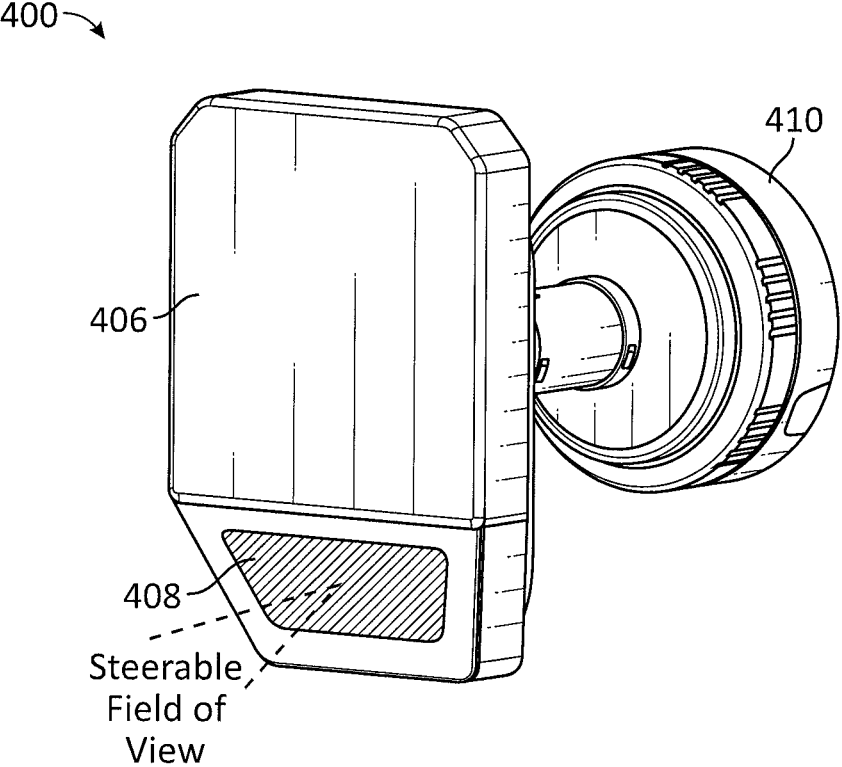

FIGS. 4A and 4B illustrate an example system 400 suitable for implementing one or more embodiments of the present disclosure. Variations in the arrangement and type of the components may be made without departing from the spirit or scope of the claims as set forth herein. Additional components, different components, and/or fewer components may be provided. In the embodiment shown in FIG. 4A, the system 400 includes the imaging system 100 of FIG. 1 and the radar system 300 of FIG. 3.

The optical assembly 180 includes an optical element 404 and an actuator 402 configured to adjust an angular position/orientation of the optical element 404. In some embodiments, the optical element 404 may direct EM radiation to the image detector circuit 165 of the imaging system 100 such that the image detector circuit 165 can capture a field of view. The field of view may be an angle through which an image sensor (e.g., a detector array) of the image detector circuit 165 is sensitive to EM radiation. In some embodiments, as the optical element 404 is rotated or otherwise adjusted, the field of view directed by the optical element 404 to the image sensor may change. In this regard, the field of view provided to the image sensor may be steered by employing the actuator 402 to adjust the optical element 404. It will be appreciated that although the optical assembly 180 is shown as being a component of the imaging system 100, the optical assembly 180 may be separate from the imaging system 100 and coupled to the imaging system 100 and the radar system 300. In such embodiments, the optical assembly 180 may receive instructions from the imaging system 100 (e.g., the processing component 105) and/or the radar system 300 (e.g., the controller 330) to adjust the optical element 404 in accordance with embodiments of the present disclosure.

In some embodiments, the system 400 may have a mode of operation in which the optical assembly 180 rotates the optical element 404, via the actuator 402, through an angle, back and forth, in an oscillating fashion. By rotating the optical element 404 through the angle, the field of view directed to the image sensor may vary in correlation to the rotation. The image sensor of the imaging system 100 may capture one or more images as the optical element 404 is rotated to provide images that capture different fields of view seen during the rotation. For example, the images may capture overlapping portions of a scene corresponding to the overlapping fields of view occurring in the rotation. The images of the overlapping fields of view may be stitched or combined to generate a panoramic image. In some embodiments, the images may be deblurred/denoised/dewarped as needed so that they may be stitched together to create the panoramic image.

In some embodiments, the system 400 may have another mode of operation in which the optical assembly 180 rotates the optical element 404 via the actuator 402 to a particular position so that one or more images can be captured of a particular field of view. In various embodiments, the imaging system 100 may communicate with the radar system 300, and vice versa, via a communication link 412 (e.g., wired and/or wireless communication link). In one embodiment, the field of view directed to the image sensor may be steered based on radar signals provided by the radar system 300 (e.g., radar return signals reflected from a scene). As one example, the radar signals may be associated with a target detected by the radar system 300. A logic circuit (e.g., the processing component 105 of the imaging system 100) may send a control signal to the optical assembly 180 to cause the actuator 402 to adjust the optical element 404 such that the field of view provided to the image sensor encompasses the target detected by the radar system 300. The particular field of view may allow for capturing images of the target detected by radar system 300 and for classifying the target based on the images of the target and/or radar return signals reflected from the target.

In the embodiment shown in FIG. 4B, a housing 406 may be implemented to enclose the imaging system 100 and the radar system 300. In other embodiments, the housing 406 may enclose one of the imaging system 100 or the radar system 300. The housing 406 may have an opening in which a window 408 may be disposed to allow EM radiation to pass through to the optical element 404 and be directed to the image sensor of the image detector circuit 165. A mount 410 may be configured to fix the system 400 in various locations such as on buildings, physical structures, watercraft, aircraft, vehicles, construction machinery (e.g., cranes), or other environments where the system 400 may be used for various applications such as, for example, leisure, commercial, navigation and/or security. The mechanical implementation of the system 400 may avoid the twisting and tangling of cables and minimize the mass of rotating components. It will be appreciated that rotation of the optical element 404 within the housing 406 does not require the entire system 400 to rotate. From an exterior observation, the system 400 appears motionless while a field of view directed to the image sensor in the system 400 may be adjusted to provide, for example, a viewing angle of 180 degrees via the rotation of the optical element 404.

Figure 5A:
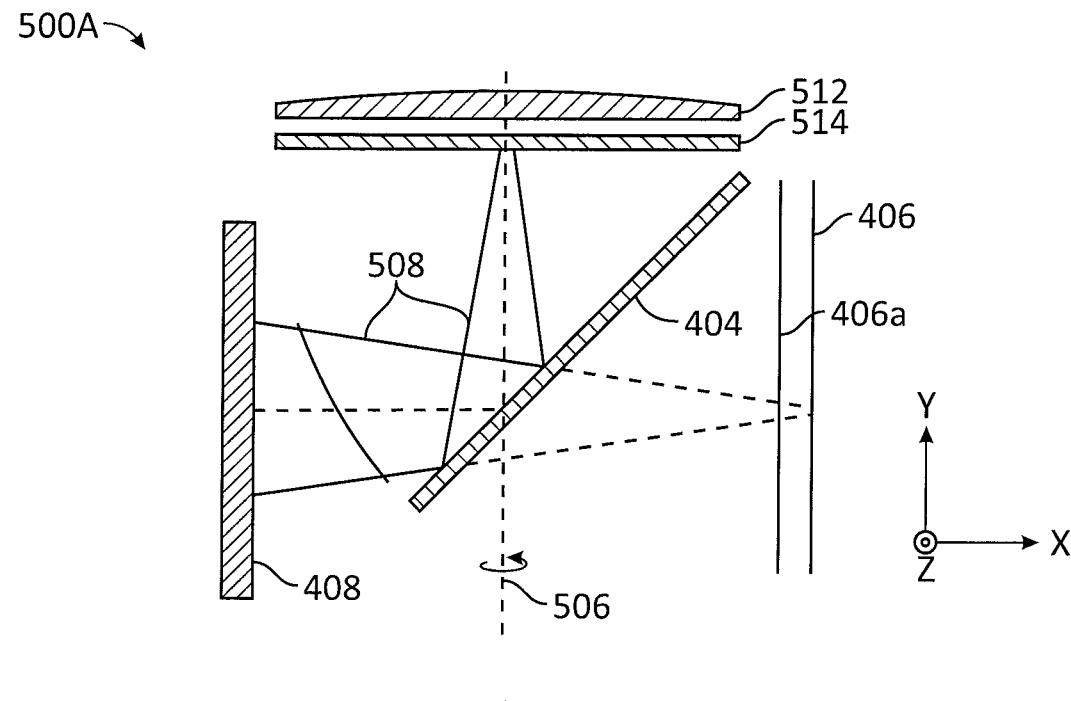
FIGS. 5A and 5B illustrate diagrams, which show the angular adjustability of a position/orientation of an optical element in accordance with one or more embodiments of the present disclosure.
Figure 5B:
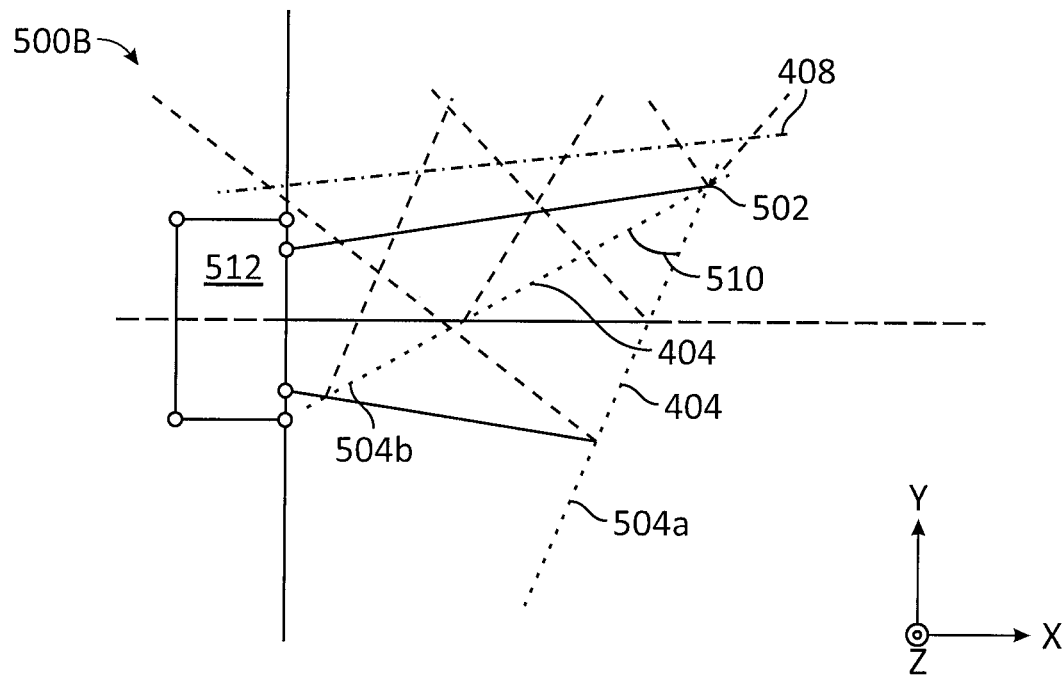

FIGS. 5A and 5B illustrate diagrams 500A and 500B, which each show the angular adjustability of a position/ orientation of the optical element 404 of the optical assembly 180 in accordance with one or more embodiments of the present disclosure. As shown in FIG. 5A, the optical element 404 may be rotated about a rotation axis 506. In some embodiments, the rotation axis 506 may be orthogonal to an image sensor 512 (e.g., parallel to the Y-axis shown in 500A). In other embodiments, the optical element 404 may be rotated about an axis parallel to the Z-axis shown in FIG. 5A. In such embodiments, where the optical element 404 is rotated about an axis parallel to the Z-axis, the optical element 404 may be flipped such that a reverse-side of the optical element 404 faces the image sensor 512. In some cases, the reverse-side of the optical element 404 may have less reflectivity and may be used to calibrate the image sensor 512 as will be further discussed herein. As one example, the optical element 404 may be a mirror.

The optical element 404 may be rotated by the actuator 402 such that than an orientation of the optical element 404 allows for EM radiation 508 that has passed through a window 408 to reflect off of the optical element 404 to be directed to the image sensor 512. In some embodiments, the EM radiation may be filtered through a lens 514 before being received by the image sensor 512. A field of view of the image sensor 512 may be adjusted by rotating the optical element 404 about, for example, the rotation axis 506. The different fields of view provided to the image sensor 512 through rotation of the optical element 404 may facilitate various calibration and imaging techniques further discussed herein.

As shown in FIG. 5B, the optical element 404 may be rotated about a pivot point 502 so that the field of view directed to the image sensor 512 is adjusted. For example, the optical element 404 may be moved from a first position 504a to a second position 504b (e.g., with an angle 510 representing an angular distance between the first position 504a and the second position 504b) by rotating the optical element 404 about the pivot point 502. It will be appreciated that the pivot point 502 may be located at a coordinate position within the coordinate space to suit a desired application in which the optical element 404 is adjusted.

Figure 6:
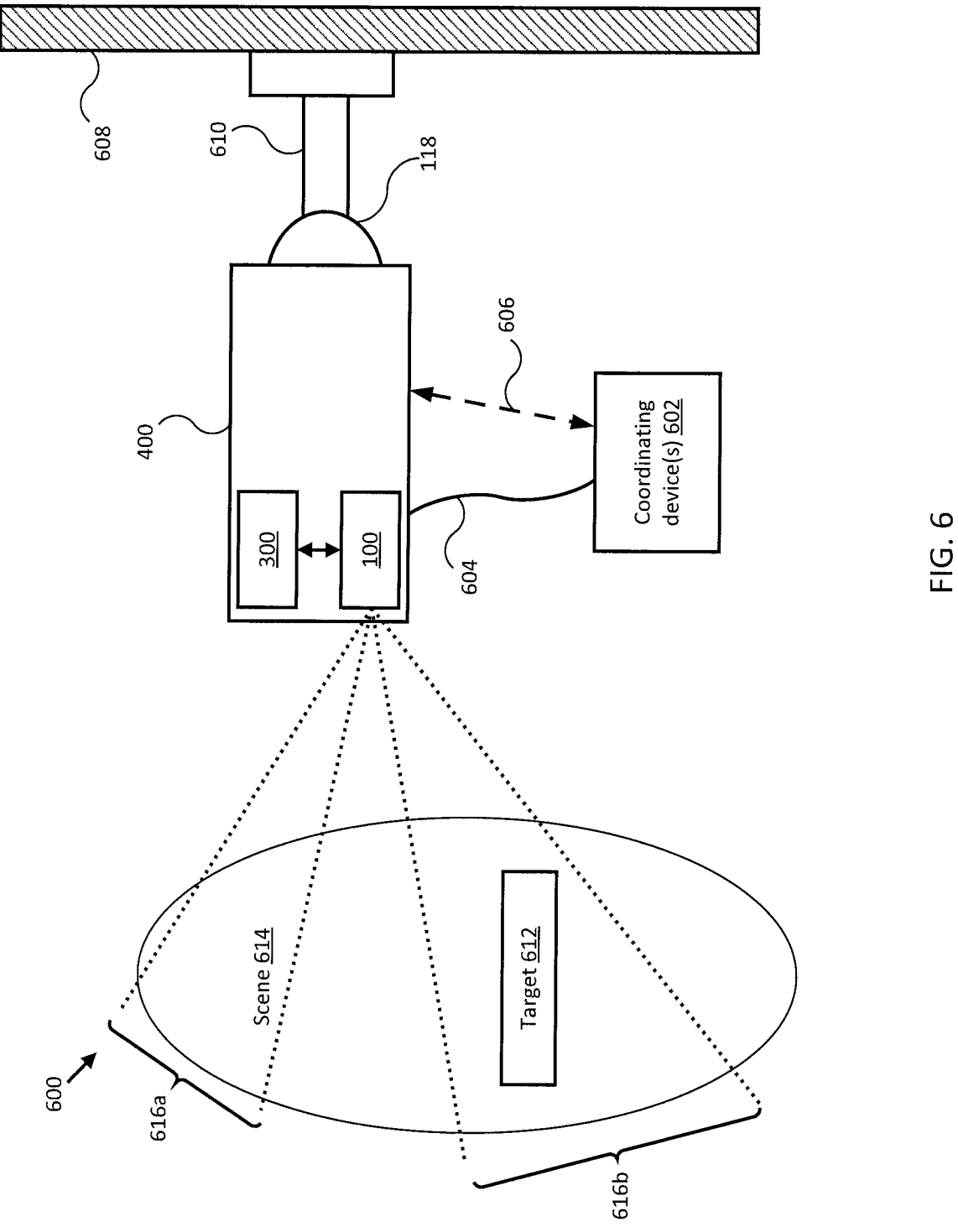
FIG. 6 illustrates an example environment in which the system of FIGS. 4A and 4B may be operated in accordance with one or more embodiments of the present disclosure.

FIG. 6 illustrates an example environment 600 in which the system 400 may be operated according to one or more embodiments of the present disclosure. The example environment 600 includes the system 400 and coordinating device(s) 602. In some embodiments, the system 400 and the coordinating device 602 may communicate with each other over a wired connection 604 and/or a wireless connection 606 to perform or facilitate various operations discussed herein. In some embodiments, the coordinating device 602 may be implemented in the system 400 to perform various operations as discussed herein, such as operations for calibration and machine training.

As shown in FIG. 6, the system 400 may be securely attached (e.g., fixed) to a structure 608 via a mount 610 to monitor and/or track targets (e.g., target 612) within a scene 614. For example, the structure 608 may be a wall, ceiling, pole, vehicle or other physical structure appropriate for installing the system 400 for purposes such as surveillance monitoring and/or navigation.

FIG. 7A illustrates an example process 700A for calibrating an imaging system in accordance with one or more embodiments of the present disclosure. FIG. 7B illustrates an example process 700B for generating images using the imaging system in accordance with one or more embodiments of the present disclosure. The blocks of processes 700A and 700B are described herein as occurring in serial, or linearly (e.g., one after another). However, multiple blocks of processes 700A and 700B may occur in parallel. In addition, the blocks of processes 700A and 700B need not be performed in the order shown and/or one or more of the blocks of processes 700A and 700B need not be performed. It is noted that several of the steps in the blocks of processes 700A and 700B may be described in reference to FIGS. 1-6 of the present disclosure. In some embodiments, processes 700A and 700B may be performed by a logic circuit. In some embodiments, the logic circuit may be, may be part of, or may include the processing component 105 of FIG. 1 and/or controller 330 of FIG. 3.

Referring to FIG. 7A, at block 702, an image sensor 512 configured to capture a field of view and an optical assembly 180 comprising an optical element 404 configured to direct the field of view to the image sensor 512 are provided. In an embodiment, the image sensor 512 may be an imaging sensor of the image capture component 115 of FIG. 1. As discussed in reference to FIG. 4A, the field of view may be an angle through which the image sensor 512 is sensitive to EM radiation directed from the optical element 404. The field of view may be adjusted through adjusting the position and/or orientation of the optical element 404.

At block 704, the logic circuit sends a control signal to the optical assembly 180 to cause rotation of the optical element 404 about an axis associated with the image sensor 512 to adjust the field of view. For example, referring to FIG. 5A, the optical element 404 may be rotated about the rotation axis 506 and/or another axis parallel to the Z-axis. In some embodiments, referring to FIG. 5B, the optical element 404 may also be rotated about the pivot point 502. Thus, the orientation of the optical element 404 may be adjusted to provide a plurality of fields of view to the image sensor 512.

In some embodiments, the optical element 404 may be adjusted so that the field of view encompasses at least a portion of an object. For example, the object may be a calibration object used to calibrate the image sensor 512. In some embodiments, the object may be enclosed within the housing 406. For example, the object may be an internal surface 406a of the housing 406 as shown in FIG. 5A. In other cases, the object may be a reverse-side of the optical element 404. For example, where the optical element 404 is a minor, a reverse-side of the mirror may be less reflective than a front-side of the mirror and used as a calibration object when the mirror is rotated or flipped such that its reverse-side faces the image sensor 512. The time that the system 400 is blind to the scene (e.g., not fully capable of imaging the scene during a calibration period) may be minimized in some embodiments when the reverse-side of the mirror is implemented to be reflective but has a lower reflectivity than the front-side (e.g., primary-side used to direct the field of view to the image sensor 512) of the minor opposite the reverse-side. It will be appreciated that scene-based non-uniformity correction may be performed by assuming scene EM radiance is essentially unchanged between the capture of an image of the scene using the more reflective side of the minor and an image using the less reflective side of the minor. For example, when the mirror is directing EM radiation from the scene to the image sensor 512, images of the scene can be captured. When the minor is flipped such that the reverse side faces the image sensor 512, attenuated images of the scene may be captured based on the reverse side having less reflectivity than the front-side. By processing the images captured when the EM radiation was directed by the minor and the images captured when the reverse side of the minor directed the EM radiation to the image sensor 512, fixed-pattern noise may be determined, and corresponding fixed-pattern noise terms may be applied to the various images to substantially remove the fixed pattern noise from the images.

In further embodiments, the object may have a uniform flat surface that can be imaged to provide offset biasing for calibrating the image sensor 512 to cancel the effects of image artifacts caused by variations in pixel-to-pixel sensitivity of the detectors of the image sensor 512 and by distortions in an optical path. For example, flat-field correction methods may be used to calibrate the image sensor 512 by using the object as a uniform intensity source.

In yet further embodiments, the image sensor 512 may capture the object at two different temperatures to determine per-pixel gain and offset biasing for calibrating the image sensor 512. For example, the logic circuit may send a control signal to the optical assembly 180 to cause rotation of the optical element 404 about the rotation axis 506 to adjust the field of view to encompass a first object during a first time duration, and further adjust the field of view to encompass a separate second object during a second time duration. The first object and the second object may each have surfaces at different respective temperatures (e.g., temperature-controlled such that they are maintained at a desired/known temperature using a heater or coupled to one or more heat sensors such that respective temperatures can be determined by the logic circuit). By capturing images of the first object and the second object, per-pixel gain and offset biasing can be determined for calibrating the image sensor 512. For example, a first image or set of images may be captured of the first object when the first object has a temperature T1 and a second image or set of images can be captured of the second object at another time when the second object has a temperature T2. Since the temperatures of the first object and the second object are known when images of them are captured, gain calibration biasing may be determined by comparing the images of the first object at temperature T1 with images of the second object at temperature T2. In one example, the first object may be a shutter and the second object may be the internal surface 406a of the housing 406. In another example, the first object may be a first layer of material within the housing 406 and the second object may be a second layer of material within the housing 406. In some cases, the layers of material may be implemented specifically for calibration purposes and may be coupled to temperature-controlling devices (e.g., heating or cooling devices) or heat sensors to facilitate calibration.

In some cases, calibration may be performed in a manner similar to the above example, except with the first object and the second object being the same object at different temperatures. In these cases, the optical element may not need to rotate to adjust the field of view to encompass the first object and then the second object. In this regard, the surface temperature of this single object can be controlled/modulated to provide two different temperatures at different times when imaging the surface so that the gain and offset biasing can be determined similar to above.

In some embodiments, the optical element 404 may be adjusted so that the field of view encompasses a scene and captured images of the scene may be used for calibration purposes. For example, the rotating motion of the optical element 404 may be known as it is controlled by the control signal provided by the logic circuit to the optical assembly 180. Thus, the logic circuit may determine frame-to-frame motion between a first image and a second image of images captured of the scene based on the known rotation motion of the optical element 404. If the scene can be assumed to be unchanging between images, the logic circuit may compare identical scene coordinates of the first image and the second image based on the frame-to-frame motion to determine pixel intensity differences and calibrate the image sensor 512 based on the pixel intensity differences.

Referring back to FIG. 7A, at block 706, the logic circuit sends a control signal to the image sensor 512 to cause one or more images to be captured. For example, the one or more images may capture at least a portion of the object (e.g., calibration object). In some embodiments, the object may span or cover the adjusted field of view such that each of the detectors (e.g., pixels) of the image sensor 512 can sense EM radiation from the object in one frame. In some embodiments, the object may not need to span or cover the entire adjusted field of view. For example, in some cases, the object may span or cover less than the adjusted field of view such that subsets of the detectors (e.g., a column of detectors) of the image sensor 512 sequentially sense the object as the optical element 404 is rotated about the axis (e.g., rotation axis 506) to adjust the field of view. For example, the object may be a narrow vertical object spanning a subset of detectors (e.g., one or more detector columns) of the image sensor 512 in any given image as the images are captured during rotation of the optical element 404. At a given time duration, a subset of the detectors (e.g., one or more detector columns) senses the object. At a next time duration, a next subset of detectors (e.g., a next one or more detector columns) senses the object. The aforementioned sensing of the object by the subsets of detector, in the sequential manner, may continue until all of the detectors of the image sensor 512 at some point have imaged the object.

At block 708, the logic circuit calibrates the image sensor 512 based on the one or more images of the object. For example, as described in reference to FIG. 2, each unit cell of the image sensor 512 may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells of the image sensor 512. By providing appropriate bias signals to each unit cell, the image sensor 512 may be effectively calibrated to provide accurate image data in response to light (e.g., IR light, visible light) incident on the detectors of the unit cells.

In further reference to FIG. 2, the control bias and timing circuitry 235 may generate bias values, timing control voltages, and switch control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. In another aspect, the control bias and timing circuitry 235 may generate the bias signals (e.g., analog signals) and provide the bias signals to the unit cells without utilizing the DAC 240. In this regard, some implementations do not include the DAC 240, the data input signal line 255, and/or the analog signal line(s) 260. In an embodiment, the control bias and timing circuitry 235 may be, may include, may be a part of, or may otherwise be coupled to the logic circuit described in reference to FIGS. 7A-8.

Referring now to FIG. 7B, in addition to calibration processes, the logic circuit may perform image processing. At block 710, the logic circuit may generate image(s) based on a combination of the one or more images captured at block 706 as the field of view is adjusted. For example, the logic circuit may operate in a first mode in which rotation of the optical element 404 about the axis (e.g., rotation axis 506) is in an oscillating fashion (e.g., sweeping back and forth through an angle of rotation). The field of view directed to the image sensor 512 from the optical element 404, as the optical element 404 is rotated, may be captured in the one or more images at block 706. A panoramic image may be continuously generated using the partially overlapped images captured during the motion of the optical element 404 in the first mode. In some embodiments, the logic circuit may apply deblurring, denoising, dewarping, and stitching in generating the panoramic image.

In some embodiments, the logic circuit may operate the system in a second mode in which the field of view may be steered to a certain position/orientation for staring and/or classification. For example, the field of view may be steered to point at a target of interest in a scene (e.g. the target 612 of the scene 614). In some embodiments, after moving the field of view to a certain position/orientation, motion of the optical element 404 may be controlled with sub-pixel accuracy so that the field of view may be adjusted by sub-pixel increments to capture a composite image with better spatial resolution. For example, if the optical element 404 is a mirror used to steer the field of view for the image sensor 512, the mirror may be moved such that the motion on the sensor plane for the image sensor 512 is a half of a pixel. Thus, the resolution of generated images may not be limited by a sensor sampling step size (e.g., pixel size). In some embodiments, the second mode of operation, wherein the field of view is steered to a certain position/orientation to encompass the target, may be referred to as a staring mode in which one or more images, in some cases offset by fractional pixel motion as discussed above, can be combined to generate a high-quality or super resolution image.

In various embodiments, the two modes described above may be used in non-linear mapping. For example, a mapping can be from a panoramic image captured in the panoramic first mode, which may be of lesser quality, to a high-quality image captured in the second staring mode. For example, machine learning can be performed to learn how to map low-quality images to high-quality images by generating ground truth data (e.g., the high-quality image output) from the staring mode and determining the input (e.g., the low-quality images) from the panoramic mode. Thus, a trained system may allow for inputs from low-quality images captured in the panoramic first mode to be directly mapped to a high-quality image output. Since the system 400 does not need to generate a panoramic image when in the staring mode/classification mode, processing power associated with panoramic image generation may be made available to improve image quality using various super resolution enhancement methods.

FIG. 8 illustrates an example process 800 for using system 400 in accordance with one or more embodiments of the present disclosure. The blocks of process 800 are described herein as occurring in serial, or linearly (e.g., one after another). However, multiple blocks of process 800 may occur in parallel. In addition, the blocks of process 800 need not be performed in the order shown and/or one or more of the blocks of process 800 need not be performed. It is noted that several of the steps and sub-steps in the blocks of process 800 may be described in reference to FIGS. 1-7B of the present disclosure. In some embodiments, process 800 may be performed by a logic circuit such as the logic circuit discussed in reference to FIGS. 7A-7B.

At block 802, the logic circuit receives radar signals from the radar system 300. For example, in reference to FIG. 6, the radar system 300 may have transmitted radar signals into the scene 614 and radar return signals may be reflected from the target 612 in the scene 614. In another case, the radar signals may have been emitted by the target 612 in the scene 614 and intercepted by the radar system 300. At block 804, based on the radar signals, the logic circuit steers the optical element 404 such that a field of view 616a directed by the optical element 404 to an image sensor 512 is adjusted to provide an adjusted field of view 616*b* that encompasses the target 612.

At block 806, the logic circuit captures, via control signals sent to the image sensor 512, one or more images of the target 612. In some embodiments, the logic circuit may correlate the radar signals received by the radar system 300 to an XY location in the image space (e.g., thermal image space, visible image space) associated with the imaging system 100. In some embodiments, the target 612 may be classified as being part of a particular class such as human, truck, car, animal, bird, etc. using the radar signals. In other embodiments, the target 612 may be classified based on the radar signals and the one or more images captured of the target 612. In some cases, where classification of the target 612 only using the radar signals does not meet a threshold of certainty, the logic circuit may rely on the one or more images captured of the target 612 to improve the certainty of the classification. In further embodiments, classification of the target 612 may be based on the one or more images captured of the target without reliance on the radar signals received from the radar system 300. Thus, classification may be based on the radar signals (e.g., a radar signature), the one or more captured images (e.g., a thermal signature when the images are thermal images), or a combination of the radar signals and the one or more captured images of the target 612 (e.g., the radar signature and the thermal signature).

In some embodiments, the image sensor 512 may correspond to a thermal imager, however, it will be appreciated that the image sensor 512 may correspond to an NIR imager, SWIR imager, or visible light imager. In some embodiments, multiple imagers may be implemented. For example, a combination selected from the thermal imager, NIR imager, SWIR imager, and visible light imager may be implemented to capture images of the target 612 in different wavebands, which may assist in the classification of the target 612. For example, if the target 612, with sufficient certainty, can be classified as being of a particular class based on a signal (e.g., images) captured from one wave band, the signal from that wave band can be used augment the classifier of another waveband.

As an example, when implementing more than one imager in a combination, a first classifier corresponding to a first imager may be a trained artificial neural network classifier. If a second classifier corresponding to a second imager (e.g., the second imager being an imager that images a different waveband than the first imager) is not able to classify a target with sufficient certainty, the signal from the second classifier may be included in a training data set along with ground truth data obtained from the first classifier. By including the signal from the second imager in the training data set along with ground truth data obtained from the first classifier, the second classifier may learn how to classify targets better based on the signals from the second imager. This may be an iterative process that continuously improves classification.

As an illustrative example, a visible light waveband classifier and a radar-based classifier may be implemented. The visible light waveband classifier may have a large amount of ground truth data whereas the radar-based classifier may have less available ground truth data. During poor illumination such as at nighttime, the visible light waveband classifier may not be able to rely on the visible light imager to classify an object to a sufficient threshold of certainty. However, the radar-based classifier can gain ground truth data during daytime operation of the visible light imager. The radar-based classifier may improve training and classification capability by using the high-certainty classifications from the visible light imager (e.g., the ground truth data) during the daytime. Thus, during the nighttime operation of the visible light imager, classifications by the visible light waveband classifier may be improved as the improved radar-based classifications can now be used to train the visible light waveband classifier for better nighttime operation.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
an image sensor configured to capture a field of view;
an optical assembly comprising an optical element configured to direct the field of view to the image sensor;
a housing configured to enclose at least the image sensor, the optical assembly, and a calibration object; and
a logic circuit configured to:
send a control signal to the optical assembly to cause rotation of the optical element about an axis associated with the image sensor to adjust the field of view;
send a control signal to the image sensor to cause one or more images of the adjusted field of view to be captured, wherein the adjusted field of view at least partially encompasses the calibration object; and
calibrate the image sensor based on the one or more images.

2. The system of claim 1, further comprising:
a radar configured to send and receive radar signals; and
wherein the logic circuit is configured to:
receive the radar signals from the radar; and
based on the radar signals, send a control signal to the optical assembly to cause rotation of the optical element to adjust the field of view.

3. The system of claim 1, wherein:
the system further comprises:

a radar configured to send and receive radar signals; and the housing is configured to enclose at least the image sensor, the optical assembly, the calibration object, and the radar.

4. The system of claim 1, wherein:

the control signal sent to the optical assembly causes the optical assembly to rotate the optical element about the axis to adjust the field of view in an oscillating fashion; and the logic circuit is configured to:

capture, via the image sensor, images of the oscillating field of view; and combine the images of the oscillating field of view to provide a panoramic image of a scene.

5. The system of claim 4, wherein:

the logic circuit is configured to operate the system in a first mode and a second mode;

the first mode comprises rotation of the optical element about the axis in the oscillating fashion and the capturing the field of view via the image sensor as the optical element is rotated about the axis; and the second mode comprises placing the optical element in a stationary position in response to received radar signals and capturing the field of view via the image sensor when the optical element is in the stationary position.

6. The system of claim 1, wherein:

the optical element comprises a mirror; and the optical assembly further comprises an actuator configured to receive the control signal from the logic circuit to rotate the mirror about the axis to adjust the field of view to the image sensor.

7. The system of claim 1, wherein the calibration object comprises an internal surface of the housing.

8. The system of claim 1, wherein:

the calibration object spans less than the field of view such that subsets of detectors of the image sensor sequentially sense the calibration object as the optical element is rotated about the axis to adjust the field of view.

9. The system of claim 1, wherein:

the calibration object comprises a reverse-side of the optical element; and the logic circuit is configured to:

send the control signal to the optical assembly to cause the rotation of the optical element such that the reverse-side of the optical element faces the image sensor and such that the adjusted field of view at least partially encompasses the reverse-side of the optical element.

10. The system of claim 1, further comprising:

a radar configured to send and receive radar signals within a scene;

wherein:

the one or more images capture a target in the scene; and the logic circuit is configured to:

classify the target in the scene based on the one or more images that capture the target and radar return signals reflected by the target and received by the radar.

11. The system of claim 1, wherein:

the control signal causes the optical assembly to rotate the optical element to adjust the field of view of the image sensor by sub-pixel increments; and the logic circuit is configured to generate a super resolution image based on a combination of images captured via the image sensor as the field of view is adjusted by the sub-pixel increments.

12. A system comprising:

an image sensor configured to capture a field of view;

an optical assembly comprising an optical element configured to direct the field of view to the image sensor;

a logic circuit configured to:

send a control signal to the optical assembly to cause rotation of the optical element about an axis associated with the image sensor to adjust the field of view;

send a control signal to the image sensor to cause one or more images of the adjusted field of view to be captured;

determine a frame-to-frame motion between a first image and a second image of the one or more images based on a motion of the adjustment of the field of view;

compare identical scene coordinates of the first image and the second image based on the frame-to-frame motion to determine pixel intensity differences at the identical scene coordinates; and calibrate the image sensor based on the one or more images and the pixel intensity differences.

13. The system of claim 12, further comprising a housing configured to enclose at least the image sensor, the optical assembly, and a calibration object.

14. The system of claim 12, further comprising:

a radar configured to send and receive radar signals; and a housing configured to enclose at least the image sensor, the optical assembly, and the radar.

15. A method comprising:

receiving radar signals from a radar, the radar signals reflected from a target in a scene;

based on the radar signals, steering an optical element such that a field of view directed by the optical element to an image sensor is adjusted to encompass the target, wherein the steering comprises switching from rotating the optical element in an oscillating fashion to placing the optical element in a stationary position to provide the adjusted field of view;

capturing, via the image sensor, one or more images of the target; and classifying the target in the scene based on images of the field of view captured by the image sensor and the radar signals reflected by the target and received by the radar.

16. The method of claim 15, further comprising:

rotating the optical element about an axis associated with the image sensor to adjust the field of view to encompass at least a portion of an object;

capturing, via the image sensor, one or more images of the object; and calibrating the image sensor based on the one or more images of the object.

17. The method of claim 15, further comprising:

rotating the optical element about an axis associated with the image sensor to adjust the field of view in an oscillating fashion;

capturing, via the image sensor, images of the oscillating field of view; and combining the images of the oscillating field of view to provide a panoramic image.

18. The method of claim 15, wherein:

the steering the optical element to adjust the field of view of the image sensor is performed in sub-pixel increments;

the one or more images of the target are captured, via the image sensor, as the field of view is adjusted by the sub-pixel increments; and the method further comprises generating a super resolution image based on a combination of the one or more images captured as the field of view is adjusted by the sub-pixel increments.

19. The method of claim 15, wherein the steering the optical element is in response to a classification of the target, the method further comprising:

training a radar-based classifier corresponding to the radar based on ground truth data obtained from an imager classifier corresponding to the image sensor, wherein the ground truth data comprises a classification of the target based on the one or more images.

20. The method of claim 15, further comprising:

training an imager classifier corresponding to the image sensor based on ground truth data obtained from a radar-based classifier corresponding to the radar, wherein the ground truth data comprises a classification of the target based on the radar signals reflected from the target in the scene.

\* \* \* \* \*